United States Patent [19]

Sudoh et al.

[11] Patent Number: 5,113,295
[45] Date of Patent: May 12, 1992

[54] RECORDING AND REPRODUCING APPARATUS FOR REWRITING DATA ONTO A PREVIOUSLY RECORDED MEDIUM USING A RELAYING OPERATION

[75] Inventors: Kengo Sudoh; Hiroshi Ii, both of Hiroshima, Japan

[73] Assignee: Sharp Kabushiki Kaisha, Osaka, Japan

[21] Appl. No.: 390,769

[22] Filed: Aug. 8, 1989

[30] Foreign Application Priority Data

Aug. 9, 1988 [JP] Japan .................. 63-199509

[51] Int. Cl.$^5$ .............................................. G11B 5/09
[52] U.S. Cl. ......................................... 360/49; 360/69
[58] Field of Search .................. 360/47, 49, 53, 69

[56] References Cited

U.S. PATENT DOCUMENTS

| | | | |
|---|---|---|---|
| 4,494,155 | 1/1985 | Veillard | 360/47 |
| 4,584,616 | 4/1986 | Allen | 360/49 |
| 4,931,885 | 6/1990 | Mester et al. | 360/53 |

FOREIGN PATENT DOCUMENTS 0081663  4/1988  Japan ............................. 360/49

*Primary Examiner*—David J. Severin

[57] ABSTRACT

An azimuth recording system has been adopted in order to heighten the recording intensity in a DAT (digital audio tape) recorder of rotary head type. For this reason, the width of a track is made more narrow than that of the magnetic head, and tracking control is conducted on the basis of the reproduction signals from the tracks at both sides during reproducing. In such a DAT recorder, in the case of rewriting data, the magnetic head is changed over to the recording mode at a point of time when reproduction operation is terminated for a corresponding track so that rewriting begins at a track which is disposed at least one thereafter the track to be rewritten, and new data is recorded, thereby causing a desired track which must be maintained to be prevented from being recorded over by a new track. In addition, a distinguisher information is recorded in each of tracks. In the case the same distinguisher information is detected when a distinguisher information is read out and compared, data which has been previously read out is not outputted, thereby ensuring that data which must be originally deleted, be prevented from being erroneously outputted. Therefore, a rewriting operation can be easily conducted without the need of any complicated control circuits.

19 Claims, 7 Drawing Sheets

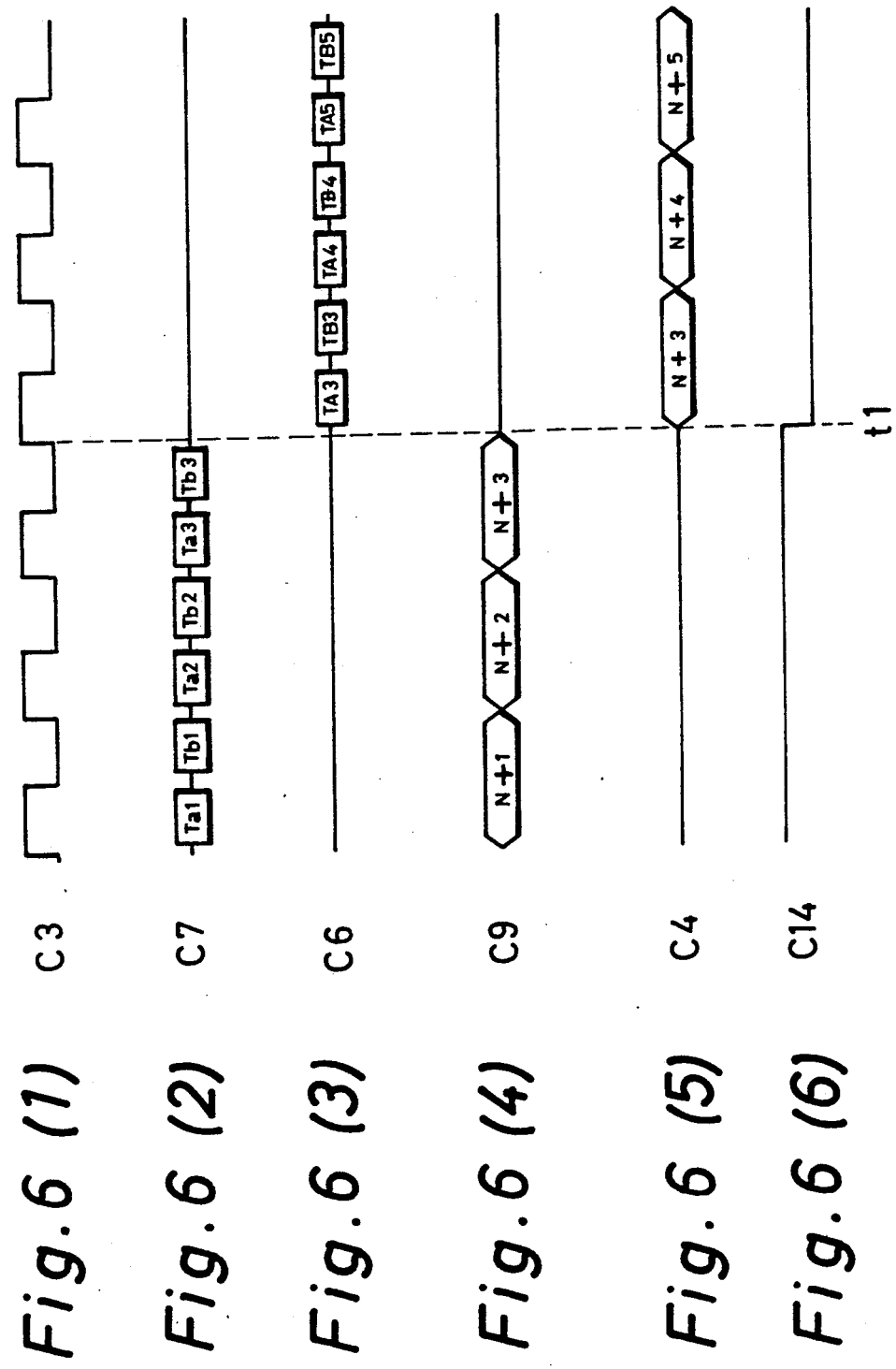

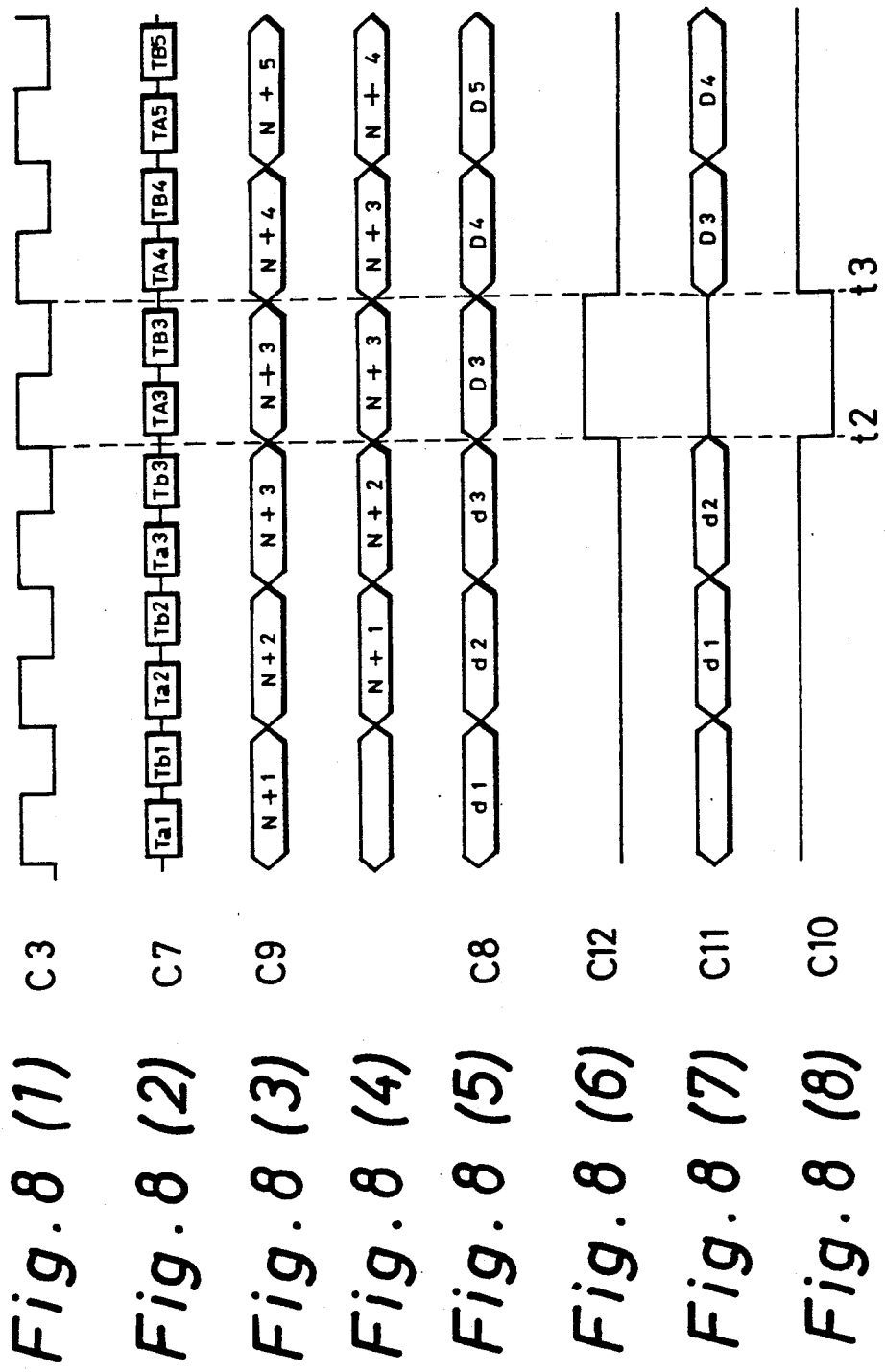

RECORDING AND REPRODUCING APPARATUS FOR REWRITING DATA ONTO A PREVIOUSLY RECORDED MEDIUM USING A RELAYING OPERATION

BACKGROUND OF THE INVENTION

1. Field of the Invention

The present invention relates to a recording and reproducing apparatus which is preferably used in a magnetic recording and reproducing apparatus of rotary head type such as a so-called DAT (digital audio tape recorder).

2. Description of the Background Art

FIG. 1 is a view showing a running mechanism of a magnetic tape 1 in a magnetic recording and reproducing apparatus of rotary head type. FIG. 1 (1) is a view showing a state in which a cassette 2 is loaded in the magnetic recording and reproducing apparatus of rotary head type. The magnetic tape 1 is wound on both a supply side reel 3a and a winding side reel 3b, respectively. The running mechanism includes and consists of a post 4, a tension post 5, guide rollers 6a and 6b, inclination posts 7a and 7b, a rotary drum 8, a pinch roller 9 and a capstan 10.

The post 4 and the tension post 5 are provided to keep the tension of the magnetic tape 1 applied to the rotary drum 8 constant. The rotary drum 8 is rotated in the direction of an arrow 11, centering around the rotary shaft 8a. The magnetic heads 12a and 12b are mounted at a position where they are opposite to each other by 180° in the rotary drum. The magnetic heads 12a and 12b have different azimuth angles, for instance an azimuth angle of +20° for the magnetic head 12a and an azimuth angle of −20° for the magnetic head 12b, in order to prevent noises due to cross talk. The rotary drum 8 is so installed on the rotary shaft 8a to be inclined by the angle $\theta°$ from an axis y on the plane x-y as shown in FIG. 1 (2).

The magnetic tape 1 is wound on the rotary drum 8 with a winding angle of about 90° by means of the guide rollers 6a and 6b and the inclination posts 7a and 7b. When recording data on the magnetic tape 1, the magnetic tape 1 runs in the direction of an arrow 13 by means of the pinch roller 9 and the capstan 10, and the rotary drum 8 is rotated in the direction of an arrow 11. Thus, the magnetic heads 12a and 12b trace the surface of the magnetic tape 1 alternately, and data is recorded in such track patterns as shown in FIG. 2.

Tracks a1, a2, a3, a4, . . . are portions recorded by the magnetic head 12a on the magnetic tape 1, and tracks a1, a2, a3, a4, . . . are read out by the corresponding magnetic head 12a having the same azimuth angle. Tracks b1, b2, b3, b4, . . . are portions recorded by the magnetic head 12b and are read out by a corresponsing magnetic head 12b. A track ai (i=1, 2, 3, 4, . . . ) and another track bi which are usually a pair constitute a frame fi. Data to be recorded is recorded with a frame number, which is distinguishing information, and provided for every frame. The frame number is a sequential number which is increased one by one per frame during recording.

In the case data of a computer is recorded on the magnetic tape 1 by using such a magnetic recording and reproducing apparatus of rotary head type as shown in the above description, it will become necessary to rewrite data after a specified frame. For example, in the aforementioned FIG. 2, it is assumed that data following frame f2 is rewritten. Reproduction is carried out up to the frame f2, and the mode is changed over from reproduction to recording at the point when reproduction is terminated at the frame f2, and a so-called relaying is performed. At this time, as the control system providing tracking control for reproduction is different from that for recording, a minute difference may occur in the running speed of the magnetic tape 1. Also, only by changing over the magnetic heads 12a and 12b from a mode of reproduction to another mode of recording, will the magnetic head 12a scan the position denoted by reference symbol P1 in FIG. 2 in the direction of arrow R1 wherein new data is recorded in the area 15 shown with oblique lines. Therefore, as shown in FIG. 3 (1), there is a problem that a part of track b2 which constitutes the frame f2 will be destroyed by the track A3 which constitutes the frame F3. Here, tracks A3, A4, . . . and tracks B3, B4, . . . are those whose data has been already written, and a track Ai (i=3, 4, . . . ) and a track Bi constitute a frame Fi.

In order to solve the above problem, in the case recording is attempted to be started accurately from the frame f3, very complicated circuits are required. For instance, if reproduction is carried out with the tracking control of the magnetic heads 12a and 12b slid and reproduction is changed over to recording at the point when the reproduction of the frame f2 is terminated, it is possible to establish tracking patterns of good form. For this reason, a control circuit for accurately controlling the timing of change-over from reproduction to recording is needed, thereby resulting in circuits of very complicated structure.

Also, if the recording mode is changed over from the reproduction mode at the point when reproduction is conducted up to the frame f3 and reproduction of the frame f3 is terminated, another problem will result. That is, the track b2 which constitutes the frame f2 is not destroyed, but the frame f3 before rewriting may remain, and data in the frame f3 will be reproduced during reproduction.

SUMMARY OF THE INVENTION

It is hence an object of the invention to provide a recording and reproducing apparatus by which data of a computer that is rewritten through relaying can be orderly reproduced in the recording sequence.

The invention relates to a recording and reproducing apparatus for recording data on and for reproducing the same from every recording area which has been defined on a magnetic recording medium, comprising;

memory means which can temporarily memorize reproduced data of each recording area, the data including distinguisher information to distinguish the recording areas, means for detecting distinguisher information of the reproduced data, and control means operable in accordance with output of the distinguisher information detecting means, for recording data and distinguisher information on the recording area, just after the previously recorded area to be rewritten during rewriting, wherein data can be during reproduction according to the sequence of reproduction from the memory means when different distinguisher information are detected in sequence during reproduction and data corresponding to the pre-detected distinguisher information can not be outputted when the same distinguisher information is continuously detected.

According to the invention, a plurality of recording areas are arranged on a magnetic recording medium. For instance, a series of data from a computer is recorded over a plurality of the recording areas and furthermore, individual distinguisher information is recorded in each of the recording areas. The distinguisher information which are individually recorded in each of the recording areas of the reproduced data is detected by the distinguisher information detecting means, and the data is memorized in a memory in correspondence to each recording area.

In the case of re-recording, that is, rewriting data on the magnetic recording medium, data and a distinguisher information for a particular frame are recorded on the recording area just after the recording area for that particular frame, in accordance with the output of the distinguisher information detecting means.

During the reproduction operation, the control means directs out data from the memory according to the sequence of reproduction when mutually different distinguisher informations are sequentially detected in the distinguisher information detecting means, and the control means stops directing out the data corresponding to the distinguisher informations previously detected, when the same distinguisher information is continuously detected.

Therefore, even through a series of data beginning with a particular frame is frame of the rewritten through relaying on the recording area from just after the particular original frame of the recording area where rewriting is required, the data having the same distinguisher information, which is duplicately reproduced, will never be reproduced repeatedly. Thus, the recorded data can be orderly reproduced.

Furthermore, an embodiment of the a recording and reproducing apparatus is characterized in that a parity check code is attached to data in each of the recording areas.

Still further, an embodiment of the recording and reproducing apparatus is characterized in that distinguisher information of the same contents is written in each of the recording areas a plural number of times.

Moreover, an embodiment of the recording and reproducing apparatus is characterized in that distinguisher information is a sequential number which is increased one by one.

Furthermore, an embodiment of the recording and reproducing apparatus is characterized in that the magnetic recording medium is a magnetic tape, and recording/reproduction is performed by a helical scan system.

As above-mentioned, according to the invention, data is recorded in a plurality of recording areas. When the same distinguisher information is continuously detected, in the case of a magnetic recording medium in which individual distinguisher informations are recorded in each of the recording areas, and is reproduced, the data in the recording area previously reproduced is output. Therefore, even though a series of data is rewritten by relaying, etc., and duplicated, the data having the same distinguisher information which is duplicately read can be prevented from being reproduced repeatedly, thereby causing the recorded data to be orderly reproduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects, the features and the advantages of the invention will be made clear in the ensuing description hereof and the following drawings which are given by way of illustration only, and thus are not limitative of the present invention, and wherein:

FIGS. 6(1)–6(6) illustrate a timing chart for explaining the data rewriting operation in the magnetic recording and reproducing apparatus 21 of rotary head type of the present invention;

FIGS. 8(1)–8(8) illustrate a timing chart for explaining the reproduction operation of the magnetic tape 35 on which data has been rewritten.

DETAILED DESCRIPTION OF THE PREFERRED EMBODIMENTS

A preferred embodiment of the invention is described in detail with reference to the drawings attached hereto.

Figure 1:
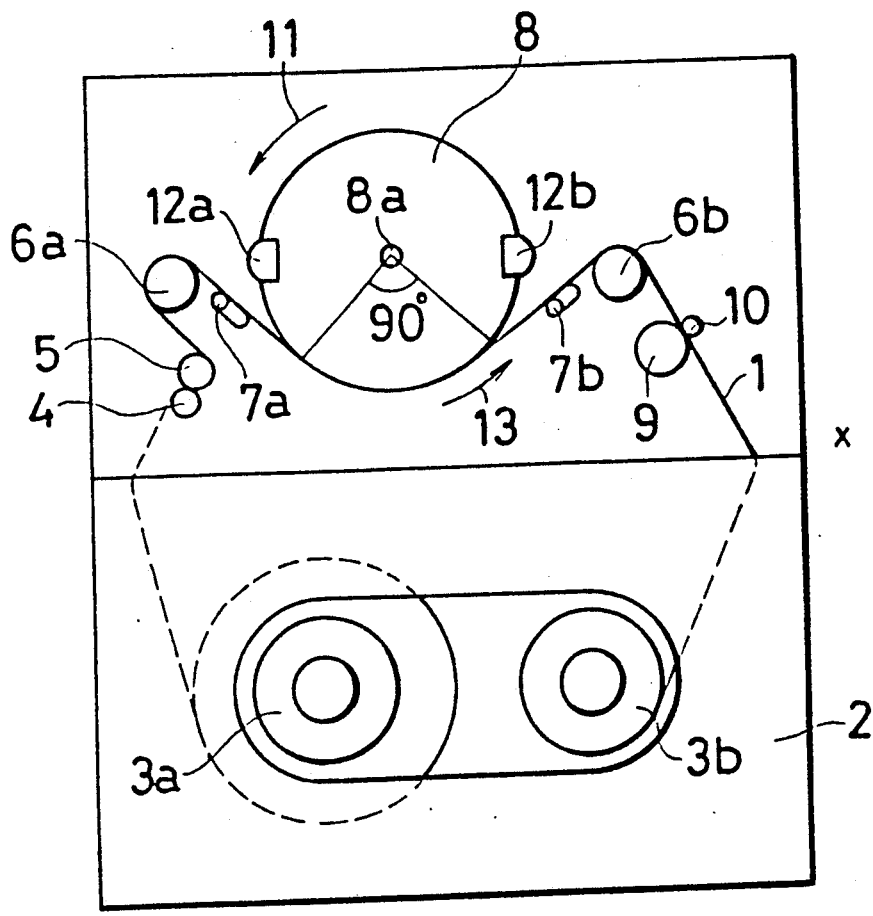
FIGS. 1(1) and 1(2) are views showing the running mechanism of a conventional magnetic tape in a magnetic recording and reproducing apparatus of rotary head type.
Figure 1:
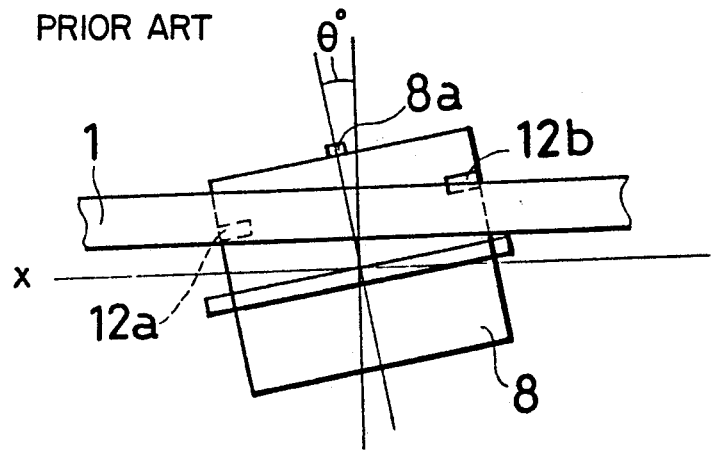
Figure 2:
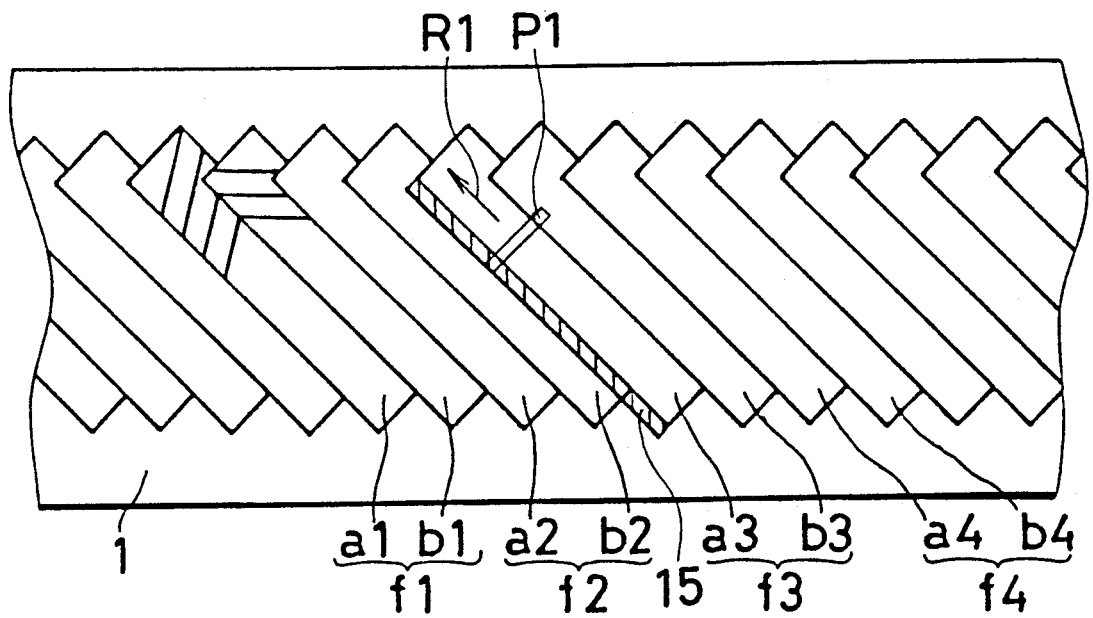
FIG. 2 is a view showing track patterns of a magnetic tape 1 on which data is recorded by the conventional magnetic recording and reproducing apparatus of rotary head type.
Figure 3:
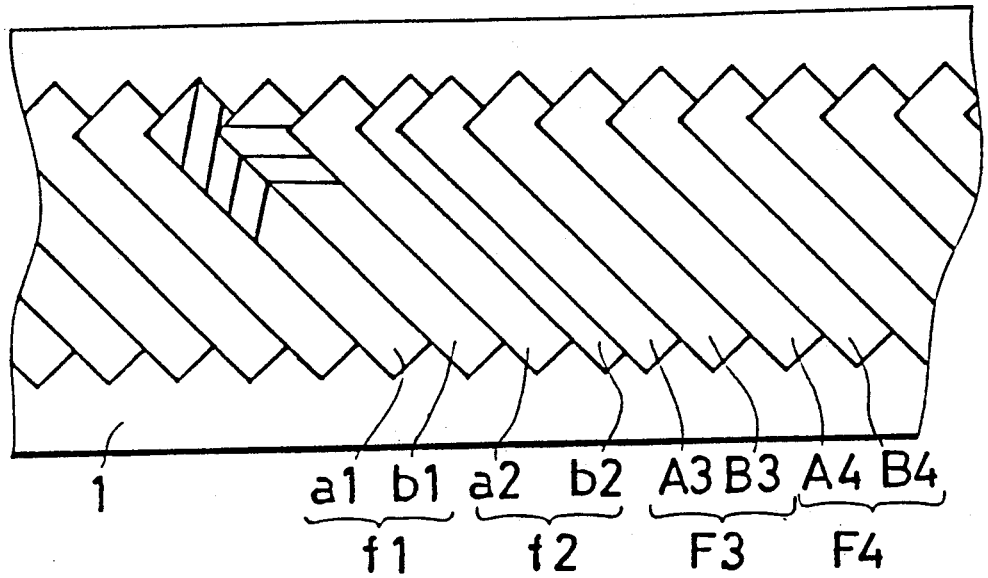
FIGS. 3(1) and 3(2) are views showing track patterns of the magnetic tape 1 in which data is rewritten by the conventional magnetic recording and reproducing apparatus of rotary head type.
Figure 3:
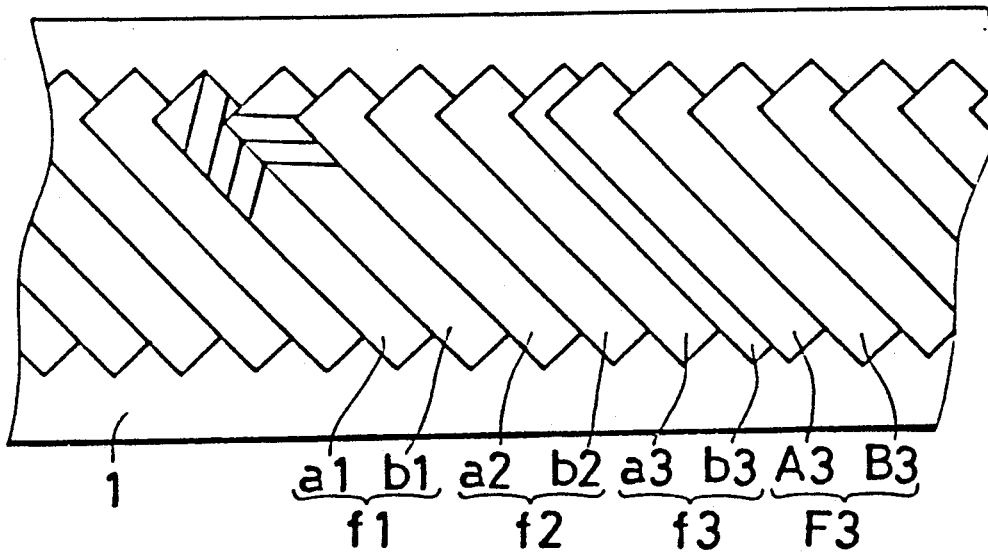
Figure 4:
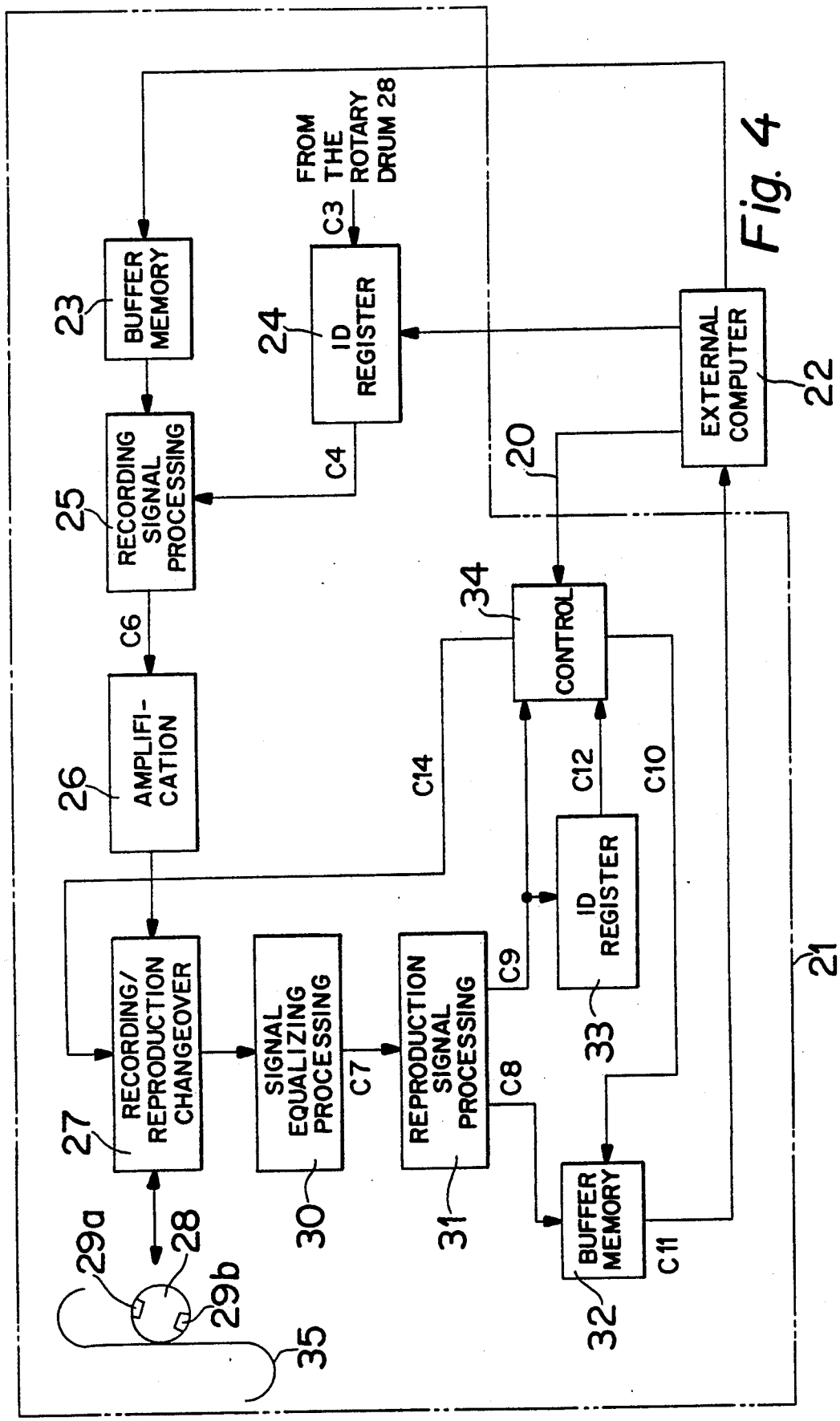
FIG. 4 is a block diagram showing the basic construction of a magnetic recording and reproducing apparatus 21 of rotary head type which is one of the preferred embodiments of the present invention.

FIG. 4 is a block diagram showing the basic construction of a magnetic recording and reproducing apparatus 21 of rotary head type according to a preferred embodiment of the present invention. In the case data is recorded on a magnetic tape 35, which is a magnetic recording medium, from an external computer 22, control signals of the external computer 22 are supplied to a control circuit 34 through a line 20. The control circuit 34 causes a recording/reproduction changeover signal C14 to be supplied to a recording/reproduction changeover switch 27, thereby causing the recording mode to be effectuated. The recording/reproduction changeover signal C14 is a signal of low level in the case of the recording mode and of high level in the case of the reproduction mode. Data which comes from the external computer 22 is temporarily memorized in a buffer memory 23.

An ID register 24 produces a distinguisher information C4 on the basis of the control signals from the external computer 22 and a drum rotation signal C3, to which expresses the cycle of rotation of a rotary drum 28, and supplies the distinguisher information C4 to a recording signal processing circuit 25. The distinguisher information C4 includes a frame number which is increased one by one per cycle of the drum rotation signal C3. The recording signal processing circuit 25 produces a recording signal C6 on the basis of data coming from the buffer memory 23 and the distinguisher information C4 coming from the ID register 24, carries out signal processing such as addition of parity check codes and modulation and supplies the recording signal C6 to an amplifier 26. The recording signal C6 is amplified by the amplifier 26 and is recorded on the magnetic tape 35 by means of magnetic heads 29a and 29b, which are mounted at the rotary head 28, through the recording-/reproduction changeover switch 27. The magnetic heads 29a and 29b have mutually different azimuth angles in order to prevent noises due to cross talk, for instance, the magnetic head 29a has an azimuth angle of $+20°$ and the magnetic head 29b has an azimuth angle of $-20°$.

When reproducing data from the magnetic tape 35, the control circuit 34 renders the recording/reproduction changeover signal C14 to be a high level and the recording/reproduction changeover switch 27 to be set to the reproduction mode. The reproduction signals which are reproduced by the magnetic heads 29a and 29b are output to a signal equalizing processing circuit 30 by way of the recording/reproduction changeover switch 27. This signal equalizing pre-processing circuit 30 carries out processing to equalize the waveform, and amplification in order to output pre-processed reproduction signals C7 to the reproduction signal processing circuit 31. The reproduction signal processing circuit 31 carries out signal processing such as demodulation and error correction of the output signals C7 and divides the output signals C7 into data C8 and distinguisher information (herein, frame number) C9. The data C8 is supplied to the buffer memory 32, and the distinguisher information C9 is output to the ID register 33 and the control circuit 34.

The ID register 33 includes a shift register and the distinguisher information C9 is sequentially shifted and inputted in the shift register. The output of the shift register is compared with the inputted distinguisher information C9. A judgement signal C12 of high level is generated if they are the same and a judgement signal of low level is generated if they are different. The judgment signal is output to the control circuit 34. The control circuit 34 supplies the data output control signals C10 to the buffer memory 32 in accordance with the judgement signals C12. The buffer memory 32 responds to the data output control signals C10 which come from the control circuit 34 by supplying the data C11 to the external computer 22.

Figure 5:
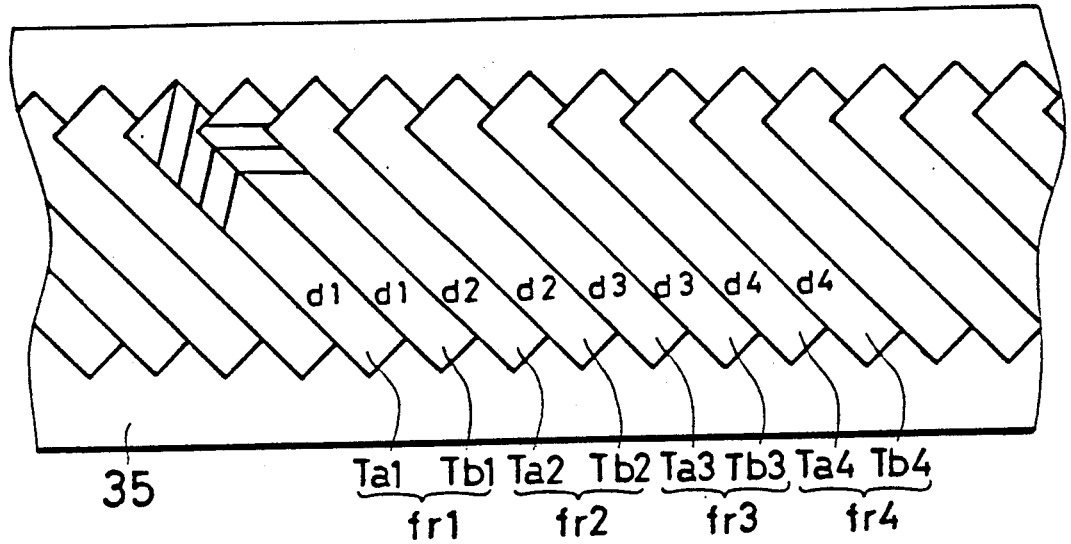
FIG. 5 is a view showing track patterns of a magnetic tape 35 on which data has been recorded by the magnetic recording and reproducing apparatus 21 of rotary head type of the present invention.

FIG. 5 is a view showing track patterns of the magnetic tape 35 on which recording signals C6 are recorded. The tracks Ta1, Ta2, Ta3, Ta4, ... are the portions in which data is recorded by the magnetic head 29a, and these tracks Ta1, Ta2, Ta3, Ta4, ... are reproduced by a corresponding magnetic head 29a. And the tracks Tb1, Tb2, Tb3, Tb4, ... are the portions in which data is recorded by the magnetic head 29b, and these tracks Tb1, Tb2, Tb3, Tb4, ... are reproduced by a corresponding magnetic head 29b. A track Tai (i=1, 2, 3, 4, ...) and another track Tbi, which are a pair, constitute a frame fri. The recording signal C6 is given a frame number per frame for recording. The frame number is a sequential number which is increased one by one per frame when recording. Here, the frame number $N+i$ is given to the frame fri (i=1, 2, 3, 4, ...) in which data di is recorded.

Next, the ensuing description explains the data rewriting operation by which data is rewritten on the magnetic tape beginning from a specified frame. Herein, it is assumed that the data after the frame fr2 in the above FIG. 5 is to be rewritten. In other words, new data will be recorded on the magnetic tape to take the place of the originally recorded data corresponding to frames fr3. FIG. 6 is a timing chart to explain the data rewriting operation. Firstly, control signals (including the frame number $N+3$) which come from an external computer 22 are supplied to the control circuit 34 through a line 20. The control circuit 34 renders the recording/reproduction changeover signal C14 to be a high level as shown in FIG. 6 (6) to secure the reproduction mode. Thereby, the data previously recorded magnetic on the tape 35 is reproduced. The reproduction signals C7 (Refer to FIG. 6 (2)) of each track which have been reproduced in synchronization with the rotary drum signal C3 shown in FIG. 6 (1) are inputted to the reproduction signal processing circuit 31 and the distinguisher information C9 is sequentially supplied to the control circuit 34 from the reproduction signal processing circuit 31. (Refer to FIG. 6 (4)).

When the distinguisher information C9 indicative of frame number $N+3$ is received, in synchronism with time t1 when reproduction of the track Tb3 is terminated, the control circuit 34 renders the recording/reproduction changeover signal C14 to be a low level for the recording mode and the recording operation is commenced. As shown in FIG. 6 (5), the ID register 24 frames a distinguisher information C4 including a frame number which is increased one by one per cycle of the rotary drum signal C3 and supplies the distinguisher information C4 to the recording signal processing circuit 25. In the recording signal processing circuit 25, a recording C6 unit of the track as shown in FIG. 6 (3) is framed, and this recording signal C6 is sequentially recorded on the magnetic tape 35.

Figure 7:
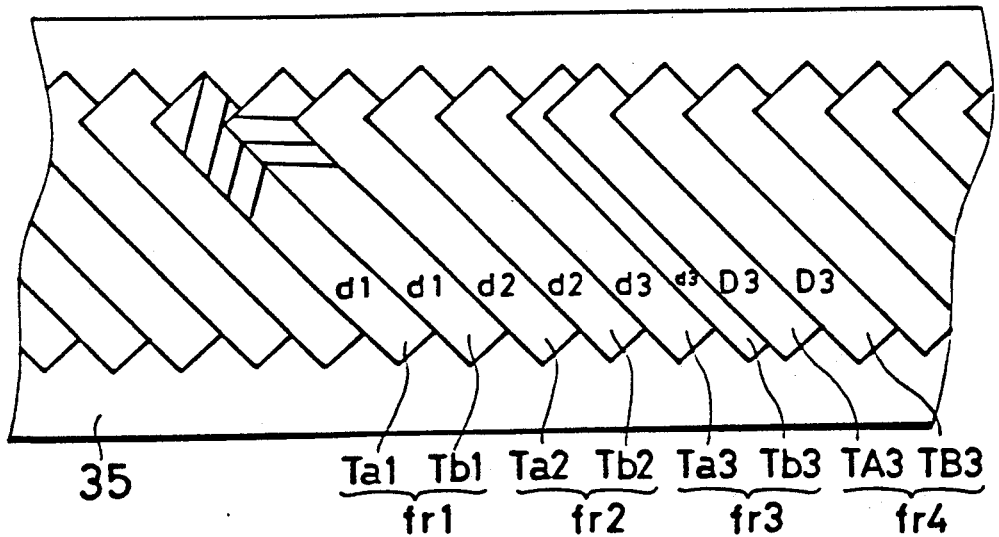
FIG. 7 is a view showing track patterns of the magnetic tape 35 on which data has been rewritten.

FIG. 7 is a view of showing the track patterns of magnetic tape 35 in which data has been rewritten by relaying as mentioned above. A track TAi (i=3, 4, ...) and another track TBi constitutes a frame FRi to which a frame number $N+i$ is given and data Di is recorded therein.

FIG. 8 is a timing chart which explains the reproduction operation of the magnetic tape 35 in which data is rewritten. The reproduction signal C7 (Refer to FIG. 8 (2)) for each of the tracks is inputted to the reproduction signal processing circuit 31 in synchronization with the rotary drum signals C3 shown in FIG. 8 (1). The reproduction signal processing circuit 31 supplies the distinguisher information C9 shown in FIG. 8 (3) to the ID register 33 and supplies data C8 shown in FIG. 8 (5) to the buffer memory 32. The shift register of the ID register 33 shifts the distinguisher information C9 by the term equivalent to one cycle of the rotary drum signal C3 as shown in FIG. 8 (4). The ID register 33 compares the distinguisher information C9 with the shifted distinguisher information, as illustrated in FIG. 8(4), and generates the judgement signal C12 output to the control circuit 34. In FIG. 8, the distinguisher information C9 and the shifted distinguisher information of FIG. 8(4) are the same between the time t2 and the time t3. Therefore, the judgement signal C12 is rendered to be a high level as shown in FIG. 8 (6), thereby causing the data output control signal C10 from the control circuit 34 to be a low level. Refer to FIG. 8(8)). As shown in FIG. 8(7), the data d3 of the frame corresponding to the frame number N+3 before rewriting, which is undesirable data that is to be replaced by new data D3, is not outputted.

As described in the above, according to the preferred embodiment of the invention, in the case data is recorded by the unit of a frame and a magnetic tape 35 on which an individual frame number is recorded for each of the above frames and is reproduced, the output of the data of the frame originally is stopped when the same frame number is consecutively detected at least twice, thereby causing the data having the same distinguisher information, which has been newly recorded, as desired data D3 to be outputted.

Thus, the recorded data can be orderly reproduced, and when rewriting data on the magnetic tape 35, data can be rewritten on the frame after the frame where rewriting is needed. In other words, newly desired information for a particular frame is recorded on the tape after the frame it is to replace. So, it becomes possible to rewrite data without using a control circuit as described with reference to the conventional art.

The present invention is intended to include various modifications which do not depart from the spirit and main features thereof. The aforementioned embodiment is intended only as an example, and the scope of this invention as described in the claims attached herein is not restricted by this specification.

Furthermore, any modifications and changes belonging to uniform ranges of the claims are in the scope of the invention.

What is claimed is:

1. A recording and reproducing apparatus for recording data on and for reproducing data from every recording area of a magnetic recording medium comprising:

memory means for temporarily storing reproduced data of each recording area, the data including distinguisher information for distinguishing the recorded areas from each other;

detecting means for detecting distinguisher information of the reproduced data; and control means for controlling recording and reproducing so that in accordance with an output of said means for detecting, data and distinguisher information can be recorded on a recording area just after a particular recording area to be recorded again during rewriting, wherein data can be outputted during reproduction according to a sequence of reproduction from said memory means when different distinguisher information are detected in sequence during reproduction and data corresponding to originally detected distinguisher information of said particular recording area cannot be outputted from said memory means when a corresponding distinguisher information is continuously detected.

2. The recording and reproducing apparatus of claim 1, wherein data recorded on the magnetic recording medium is recorded with a parity check code for each of the recording areas.

3. The recording and reproducing apparatus of claim 1, wherein said distinguisher information is overwritten a plural number of times for each of the recording areas.

4. The recording and reproducing apparatus of claim 1, wherein said distinguisher information is a number which is sequential increased by one for each of the recording areas.

5. The recording and reproducing apparatus of claim 1, wherein the magnetic recording medium is a magnetic tape and recording/reproducing is performed helically.

6. A recording/reproducing apparatus for use with a magnetic recording medium of plural recording areas comprising:

recording/reproducing means for recording new data over previously recorded old data on the magnetic recording medium during a recording mode in accordance with a recording signal and for reproducing the data from the magnetic recording medium during a reproduction mode to generate a reproduced signal, the data of each of the recording areas including distinguishing information which identifies the recording areas;

reproduction signal processing means for demodulating said reproduced signal and for separating and outputting the data and said distinguishing information;

memory means, coupled to said reproduction signal processing means, for storing said separated data;

register means, coupled to said reproduction signal processing means, for comparing a received distinguishing information with a previously received distinguishing information and for outputting a coincidence signal upon coincidence thereof; and control means for generating a data output control signal to said memory means during absence of receipt of said coincidence signal, said data output control signal not being generated upon receipt of said coincidence signal, said memory means outputting as output data the data corresponding to said previously received distinguishing information upon receipt of said data output control signal so that remaining old data and recorded new data are output in proper sequence and being inhibited from outputting data in absence of receipt of said data output control signal.

7. The recording/reproducing apparatus of claim 6, wherein said received distinguishing information and said previously received distinguishing information are consecutively received.

8. The recording/reproducing apparatus of claim 6, wherein the magnetic recording medium is magnetic tape and recording/reproducing is performed helically.

9. The recording/reproducing apparatus of claim 6, wherein the new data is recorded on the magnetic recording medium in a recording area immediately following a recording area of the old data which it is to replace.

10. The recording/reproducing apparatus of claim 6, further comprising:

recording signal processing means for modulating and amplifying input data and for assigning said distinguishing information thereto to generate said recording signal, said distinguishing information being recorded a plurality of times for each of the recording areas.

11. The recording/reproducing apparatus of claim 10, wherein said recording signal additionally comprises a parity check code.

12. A method of recording new data over old data on a magnetic recording medium and of outputting reproduced data using a recording/reproducing apparatus, the magnetic recording medium having frames in which the data is recorded, the data of each frame including distinguishing information for identifying each frame, the method comprising the steps of:

recording the new data over the old data on the magnetic recording medium in a recording area which includes a starting frame that immediately follows after a first frame of the old data;

reproducing the old data, which remains after said step of recording, and the new data in signal processing means to generate reproduced data and distinguishing information for each of the frame;

storing the reproduced data in memory means;

storing the distinguishing information, received from the signal processing means, in a register and comparing the received distinguishing information with previously received distinguishing information to generate a coincidence signal upon coincidence thereof;

generating a data output control signal, in control means coupled to the register, in absence of output of the coincidence signal, the data output control signal not being generated upon receipt of the coincidence signal; and outputting as output data from the memory means the reproduced data corresponding to the previously received distinguishing information upon generation of the data output control signal and inhibiting the memory means from outputting data when the data output control signal is not generated.

13. The method of recording and outputting of claim 12, wherein the received distinguishing information and the previously received distinguishing information which are compared in said comparing step are received consecutively.

14. The method of recording and outputting of claim 12, wherein the data is recorded on magnetic tape helically.

15. The method of recording and outputting of claim 12, said step of recording further comprising:

modulating and amplifying input data, in a recording signal processing means, and assigning the distinguishing information thereto to generate the new data, the distinguishing information being recorded a plurality of times in each of the frames.

16. The method of recording and outputting of claim 13, said step of recording further comprising assigning a parity check code to the new data of each of the frames.

17. A method of outputting data reproduced from a magnetic recording medium which includes new data recorded over previously recorded old data, from a recording/reproducing apparatus, the magnetic recording medium having frames in which the data is recorded, the data of each frame including distinguishing information for identifying each frame, the method comprising the steps of:

reproducing the data of the magnetic recording medium to generate reproduced data and distinguishing information for each of the frames;

storing the reproduced data in memory means;

storing the distinguishing information, received from the signal processing means, in a register and comparing the received distinguishing information to generate a coincidence signal upon coincidence thereof;

generating a data output control signal, in control means coupled to the register, in absence of output of the coincidence signal, the data output control signal not being generated upon receipt of the coincidence signal; and outputting the reproduced data from the memory means which corresponds to the previously received distinguishing information upon generation of the data output control signal so that remaining old data and recorded new data are output in proper sequence and inhibiting the memory means from outputting data when the data output control signal is not generated.

18. The method of outputting data of claim 17, wherein the new data is recorded in a frame of the magnetic recording medium immediately following a frame of the old data which it is to replace.

19. The method of outputting data of claim 17, wherein the received distinguishing information and the previously received distinguishing information which are compared in said comparing step are received consecutively.

* * * * *